(12) United States Patent
Baker

(10) Patent No.: US 6,327,478 B1
(45) Date of Patent: Dec. 4, 2001

(54) SHORT MESSAGE PARK AND PAGE SYSTEM AND METHOD

(75) Inventor: Steven F. Baker, Alpharetta, GA (US)

(73) Assignee: Northern Telecom, Ltd., Montreal (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/219,557

(22) Filed: Dec. 23, 1998

(51) Int. Cl.$^7$ ...................................................... H04Q 7/20
(52) U.S. Cl. ........................ 455/466; 455/425; 455/412; 455/414; 340/7.1; 340/7.21
(58) Field of Search ................................... 455/412, 425, 455/422, 428, 466, 515, 574, 550, 485, 438, 439, 566, 414; 340/7.1, 7.21, 7.28

(56) References Cited

U.S. PATENT DOCUMENTS

| 5,590,396 | * | 12/1996 | Henry ..................................... 455/426 |
| 5,842,141 | * | 11/1998 | Vaihoja et al. ......................... 455/574 |
| 5,884,170 | * | 3/1999 | Valentine et al. ...................... 455/433 |
| 5,940,756 | * | 8/1999 | Sibecas et al. ......................... 455/426 |
| 6,049,713 | * | 4/2000 | Tran et al. .............................. 455/415 |
| 6,141,550 | * | 10/2000 | Ayabe et al. ........................... 455/433 |
| 6,201,974 | * | 3/2001 | Lietsalmi ............................... 455/466 |
| 6,216,008 | * | 3/2001 | Lee ....................................... 455/466 |
| 6,230,019 | * | 5/2001 | Lee ....................................... 455/466 |

* cited by examiner

Primary Examiner—William Trost
Assistant Examiner—Congvan Tran
(74) Attorney, Agent, or Firm—H. Lisa Koh; Thompson & Knight

(57) ABSTRACT

A method of and system for processing calls to a wireless unit determines if the wireless unit is in a "page-only" mode or otherwise unavailable to receive the call. If said wireless unit is unavailable to receive the call, system determines if the calling party would like to send a page to the wireless unit. If so, the system sends a short message to the wireless unit. The short message identifies the calling party and provides an option to receive the call. When the wireless unit receives the short message page, the called party can elect to receive the call by sending short message response to the system. When the system receives the short message response, the system completes the call to said wireless unit if the short message response indicates selection of the option to receive the call.

20 Claims, 3 Drawing Sheets

SHORT MESSAGE PARK AND PAGE SYSTEM AND METHOD

FIELD OF THE INVENTION

The present invention relates generally to the field of wireless telecommunication, and more particularly to a method and system for completing a call to an unavailable wireless unit.

DESCRIPTION OF THE PRIOR ART

Currently, when a wireless subscriber is not reachable, the calling party waits through a series of ring back tones and is eventually provided with an announcement indicating that the cellular subscriber cannot be reached. If the subscriber has voice mail, the call is eventually routed to the subscriber's voice mail box where the caller listens to the subscriber's greeting and leaves a message. The subscriber accesses voice mail messages by calling his or her voice mail box and navigating through voice response mail selection menus. If the subscriber does not have voice mail, the calling party is simply advised that the subscriber is not available and the call is terminated.

In addition to normal voice services, wireless operators offer short message services to wireless subscribers. A short message service enables a user with a short message service enabled wireless unit to receive and send the text messages over the wireless network. The short messages are typically transmitted over a control channel of the wireless network rather than a voice channel. The short message service attempts to deliver a message to a wireless unit whenever the unit is registered to the network, even when the terminal is engaged in a voice or data call, or otherwise unavailable.

Short message services allow a wireless unit to function effectively as a pager. If a wireless subscriber is in a meeting or other situation in which he desires not to receive voice calls, he can set his wireless unit to "page-only" mode. Currently, if a subscriber receives a page that indicates that a party wishes to speak to him, he must place a call to the other party.

SUMMARY OF THE INVENTION

The present invention provides a method of and system for processing calls to an unavailable wireless unit. When the system of the present invention receives a call to a wireless unit, the system determines if the wireless unit is in a "page-only" mode or able to receive short messages but otherwise unavailable to receive the call. If the wireless unit is unavailable to receive the call, system of the present invention determines if the calling party would like to send a page to the wireless unit. If so, the system sends a short message to the wireless unit. The short message identifies the calling party and provides an option to receive the call. When the wireless unit receives the short message page, the subscriber can elect to receive the call by sending short message response to the system. When the system receives the short message response, the system completes the call to the wireless unit if the short message response indicates selection of the option to receive the call.

The system of the present invention includes a mobile switching center, a wireless service node, and a short message center. The mobile switching center receives the call and determines if the wireless unit is unavailable. The mobile switching center forwards the call to the wireless service node, which carries on an automated dialogue with the calling party to determine if the calling party wishes to have the subscriber paged. Preferably, the wireless service node includes speech recognition software so that the dialogue can be carried on in natural language. The wireless service node announces that the called party is unavailable and inquires if the calling party wishes to have the subscriber paged. If so, the wireless service node prompts the calling party to identify himself, either by name or telephone number. The wireless service node composes a short message identifying the calling party and providing an option to be connected to or "join" the calling party. The wireless service node sends the short message to the short message service center for delivery to the wireless unit and advises the calling party to hold. If the called party wishes to be connected to the calling party, the calling party sends a short message response selecting the join option back to the short message center for delivery to the wireless service node. The wireless service node advises the calling party that the call will be completed and instructs the mobile switching center to complete the call to the wireless unit.

DESCRIPTION OF THE PREFERRED EMBODIMENT

Figure 1:
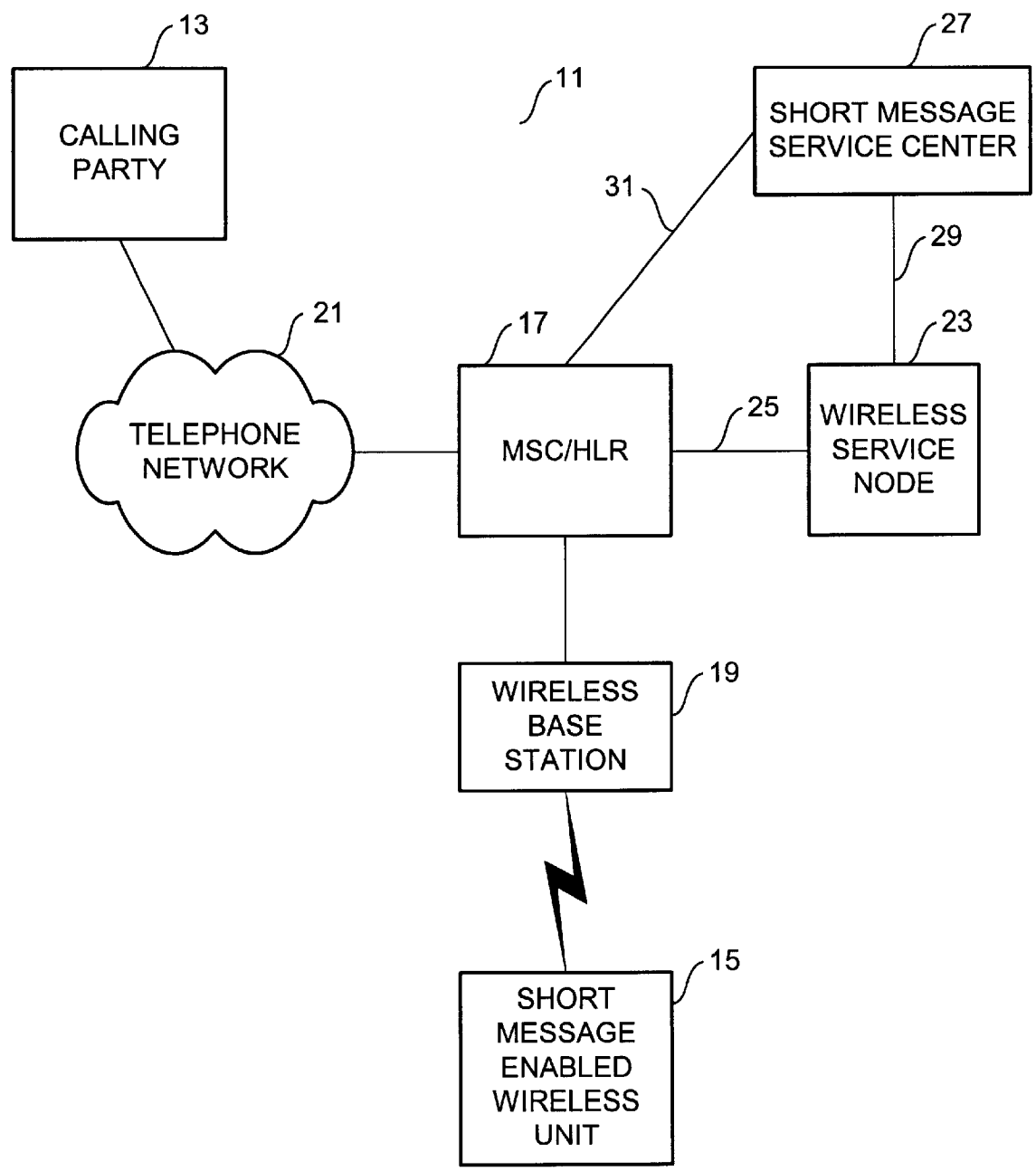
FIG. 1 is a block diagram of a system according to the present invention.

Referring now to the drawings, and first to FIG. 1, a telephone system is designated generally by the numeral 11. Telephone system 11 is adapted to process calls from a calling party, indicated generally at 13, to a short message enabled wireless unit 15. Short message enabled wireless unit 15 is provided with services by a wireless telephone system, which includes a mobile switching center 17 and a wireless base station 19. Mobile switching center 17 is connected to calling party 13 through a telephone network, indicated generally at 21.

Generally, when a call is received at mobile switching center 17, the mobile switching center consults a home location register (HLR) or a visitor location register (VLR) to obtain routing information. The call is then routed to the appropriate wireless base station 19 for transmission to wireless unit 15. According to the present invention, mobile switching center 17 tracks the status of wireless unit 15. Whenever the HLR or VLR indicates that wireless unit 15 is in "page-only" mode or otherwise unavailable to receive normal calls, mobile switching center 17 immediately connects calling party 13 to a wireless service node 23 over a voice trunk 25.

Wireless service node 23 is programmed according to the present invention to carry on an automated natural language dialog with calling party 13. Wireless service node 23 includes a speech recognition system such as Dragon NaturallySpeaking™ or IBM ViaVoice™. As will be explained in detail hereinafter, wireless service node 23 provides calling party 13 with the opportunity to have a page sent to short message enabled wireless unit 15 advising the called party or subscriber that he has a call from the calling party and giving the subscriber the option to be connected to the calling party. If the calling party desires to have the called party paged, wireless service node 23 composes a short text message that is communicated to a short message service center 27 over a short message point-to-point interface 29.

The short message identifies the calling party and provides a join option. Short message service center 27 forwards the short message to mobile switching center 17 over an IS-41 interface 31. Mobile switching center 17 delivers the short message to wireless base station 19, which in turn delivers the short message to wireless unit 15.

The short message appears on short message enabled wireless unit 15 as a page. The subscriber can read the page and decide whether or not to receive the call. The subscriber may be in a meeting or the like. If the subscriber wishes to receive the call, then the subscriber sends a short message response back to short message service center 27 through wireless base station 19 and mobile switching center 17, takes the wireless unit out of page-only mode, and excuses himself from the meeting. Short message service center 27 delivers the short message response to wireless service node 23 over the short message point-to-point interface 29. If the short message response indicates that the calling party wishes to receive the call, wireless service node 23 releases the call with instructions to mobile switching center 17 to complete the call to wireless unit 15. Wireless unit 15 rings and the parties are connected in the normal fashion.

Figure 2:
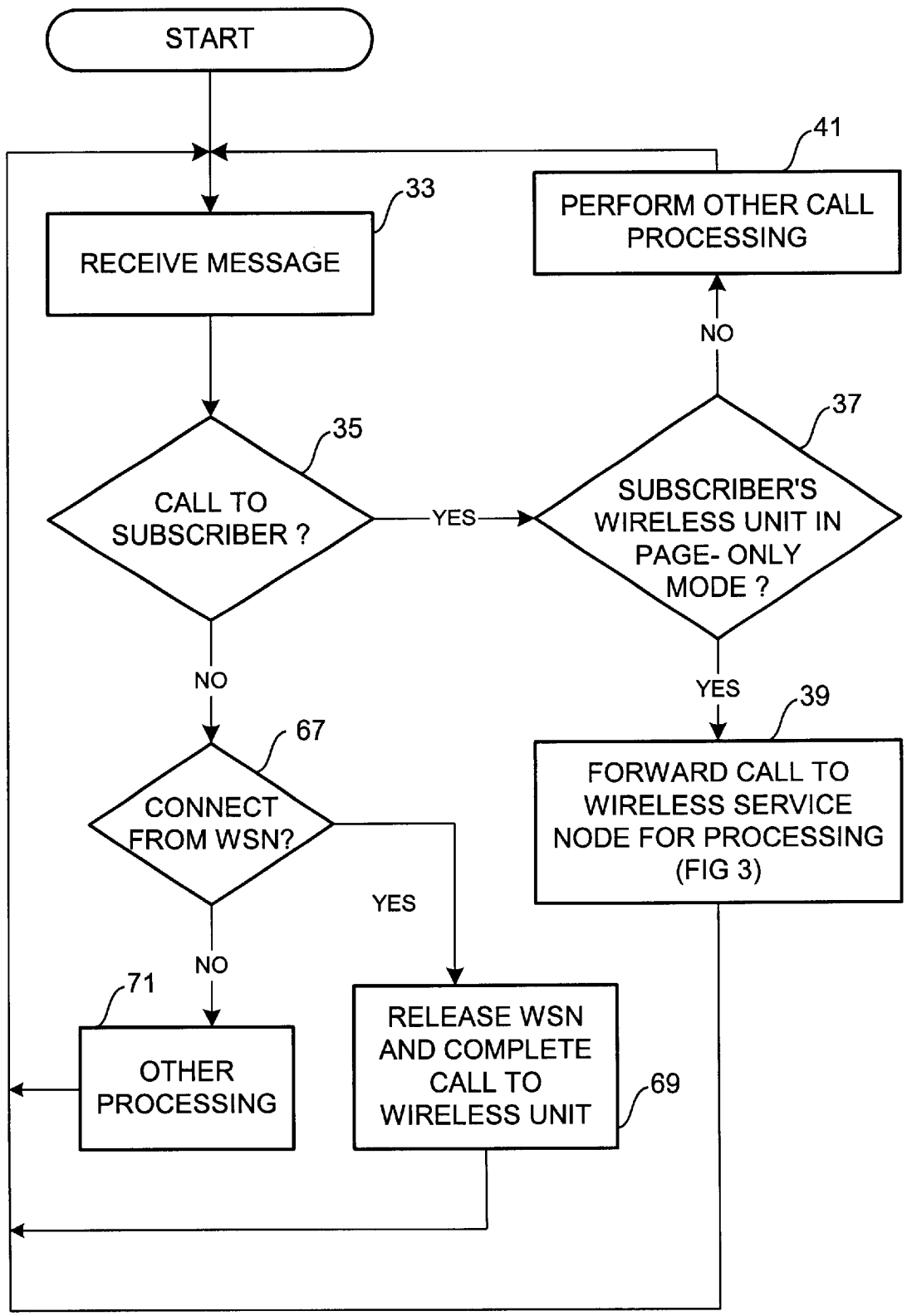
FIG. 2 is a flowchart of mobile switching center processing according to the present invention.

Referring now to FIG. 2, there is shown a high level flow chart of mobile switching center processing according to the present invention. The mobile switching center receives messages at block 33. The messages are typically SS7 ISUP and IS-41 messages relating to call set up, tear down, and the like. The mobile switching center determines, at decision block 35 if the message is a call to a subscriber. If so, the mobile switching center queries the HLR/VLR for wireless unit status and location information. If, at decision block 37, the subscriber's wireless unit is in page only mode, the mobile switching center forwards the call to the wireless service node for processing at block 39 and returns to block 33. If, at decision block 37, the subscriber's wireless unit is not in page only mode, then the mobile switching center performs other processing indicated generally at block 41.

Figure 3:
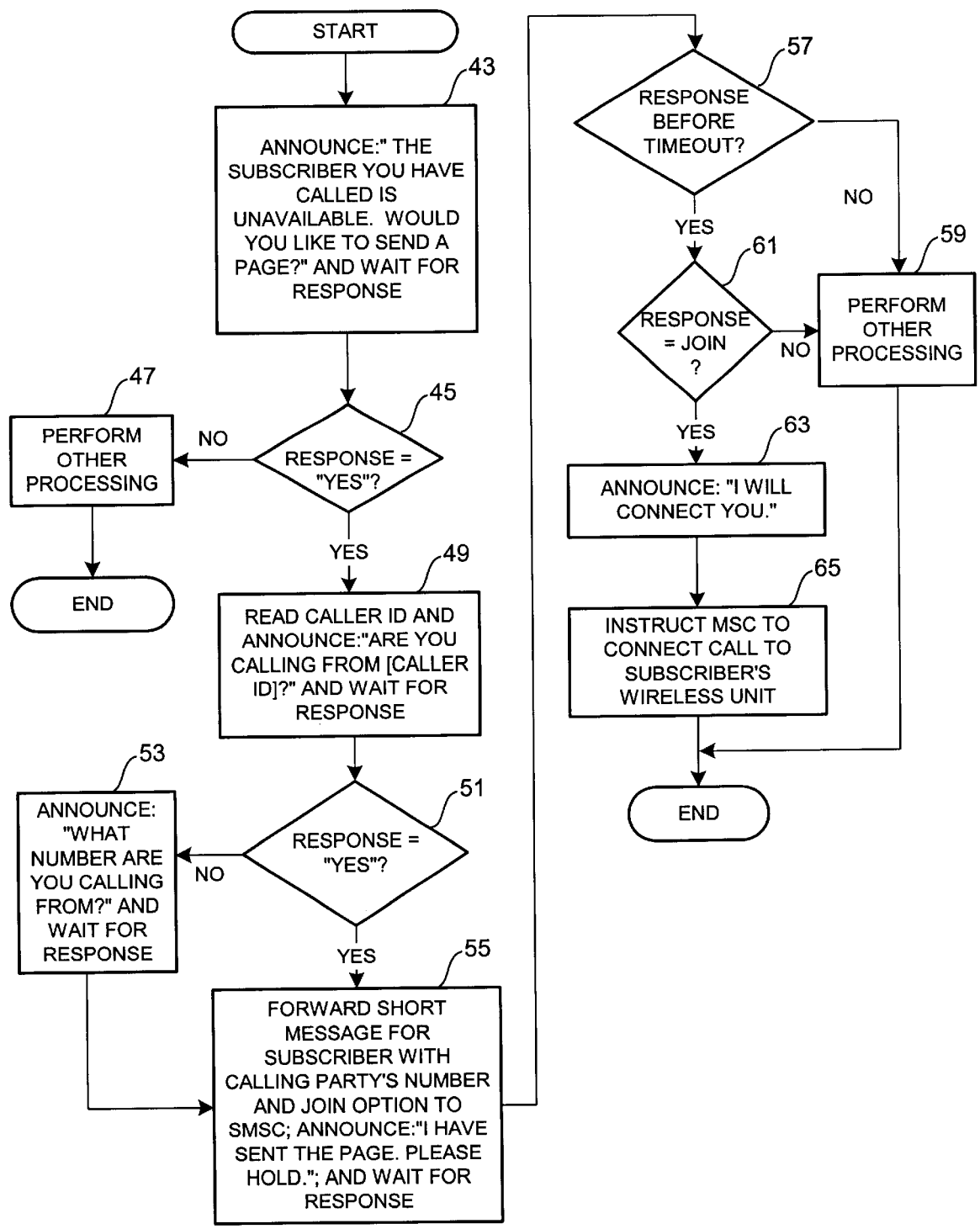
FIG. 3 is a flowchart of wireless service node processing according to the present invention.

Referring now to FIG. 3, there is shown a flow chart of wireless service node processing according to the present invention. At block 43, the wireless service node announces "The subscriber you have called is unavailable. Would you like to send a page?" and waits for response. If, at decision block 45, the calling party's response is "Yes" then the wireless service node identifies the calling party. If the calling party's response is not "Yes", then the wireless service node performs other processing such as providing an option to be connected to voice mail, indicated generally at block 47, and processing ends.

In the preferred embodiment, the wireless service node identifies the calling party by reading caller ID information transmitted with the call and announcing "Are you calling from [caller ID number]?". Alternatively, the wireless service node can ask the calling party for his name or telephone number. After the wireless service node has asked the calling party to confirm his telephone number, the wireless service node waits for a response. If, at decision block 51, the response is not "Yes", then the wireless service node announces "What number are you calling from?" and waits for a response, at block 53. The wireless service node uses its speech-to-text conversion capability to convert the spoken number to a text number.

After identifying the calling party, the wireless service node forwards a short text message for the subscriber with the calling party's number and a join option to the short message service center, at block 55. Also at block 55, the wireless service node announces "I have sent the page. Please hold." and waits for a response. If, at decision block 57, no short message response is received from the subscriber before time out, the wireless service node performs other processing, indicated generally at block 59 and wireless service node processing ends. Other processing may include announcing that the subscriber did not respond to the page and releasing the call back to the mobile switching center.

If, at decision block 57, a short message response is received before time out, then the wireless service node determines, at decision block 61 if the response is a join. If not, the wireless service node performs other processing at block 59 and processing ends. If, at decision block 61, the response is a join, then the wireless service node announces "I will connect you.", at block 63 and instructs the mobile switching center to connect the call to the subscriber's wireless unit, at block 65.

Returning now to FIG. 2, if, at decision block 67, the mobile switching center receives a connect message from the wireless service node, the mobile switching center releases the wireless service node and completes the call to the wireless unit, at block 69. If, at decision block 67, the message is not a connect from the wireless service node, then the mobile switching center performs other processing, as indicated generally at block 71.

From the foregoing, it may be seen that the present invention overcomes the shortcomings of the prior art. The present invention uses the short message service infrastructure to increase the functionality of a wireless telephone system. A subscriber selectively receives important calls according to the present invention without having his wireless unit ring and disturb others in meetings. The present invention eliminates the need for the subscriber to excuse himself from a meeting and try to call the other party. Callers can reach subscribers efficiently without having to use voice mail and without having to remain available to receive a call back.

What is claimed is:

1. A method of processing a call from a calling party to a called party's wireless unit, said method comprising the computer implemented steps of:

receiving from said calling party a call intended for said called party's wireless unit;

if said called party's wireless unit is unavailable to receive said call, sending a short message to said called party's wireless unit, said short message identifying said calling party and said short message providing the called party an option to join said calling party during said call;

receiving from said called party's wireless unit a response to said short message, said response indicating whether said called party desires to receive said call; and if said response to said short message indicates said called party has selected said option to join said calling party, connecting said calling party to said called party's wireless unit during said call.

2. The method as claimed in claim 1, including the computer implemented step of determining if said called party's wireless unit is in a page-only mode.

3. The method as claimed in claim 1, including the computer implemented step of determining if said calling party would like to send a page to said called party's wireless unit.

4. The method as claimed in claim 1, including the computer implemented step of prompting said calling party to identify himself.

5. The method as claimed in claim 4, wherein said step of prompting said calling party to identify himself includes the computer implemented step of prompting said calling party to speak his telephone number.

6. The method as claimed in claim 4, wherein said step of prompting said calling party to identify himself includes the computer implemented steps of:

announcing the telephone number of said calling party; and prompting said calling party to confirm his telephone number.

7. The method as claimed in claim 1, wherein said call is received at a mobile switching center.

8. The method as claimed in claim 7, including the computer implemented step of forwarding said call to a wireless service node.

9. The method as claimed in claim 8, wherein said step of determining if said calling party would like to send a page to said wireless unit is performed at said wireless service node.

10. The method as claimed in claim 8, wherein said step of sending said short message to said called party's wireless unit includes the computer implemented steps of:

sending said short message from said wireless service node to a short message service center for delivery to said called party's wireless unit; and delivering said short message from said short message service center to said called party's wireless unit.

11. The method as claimed in claim 10, wherein said step of receiving from said called party's wireless unit said response to said short message includes the computer implemented steps of:

receiving said response at said short message service center; and delivering said response to said wireless service node.

12. The method as claimed in claim 11, wherein said step of connecting said calling party to said called party's wireless unit during said call includes the computer implemented step of releasing said call from said wireless service node for completion to said called party's wireless unit by said mobile switching center.

13. A method of processing a call from a calling party to a called party's wireless unit, said method comprising the computer implemented steps of:

receiving a call intended for said called party's wireless unit from said calling party at a mobile switching center;

determining if said called party's wireless unit is unavailable to receive said call;

forwarding said call to a wireless service node if said called party's wireless unit is unavailable to receive said call;

determining if said calling party desires to have a page sent to said called party's wireless unit;

sending a short message from said wireless service node to a short message service center, said short message identifying said calling party and said short message providing said called party an option to join said call during said call;

sending said short message from said short message service center to said called party's wireless unit;

receiving at said short message service center from said called party's wireless unit a response to said short message;

forwarding said response from said called party's wireless unit to said wireless service node; and instructing said mobile switching center to complete said call to said called party's wireless unit during said call if said response indicates the called party has selected said option to join said call.

14. A method of processing a call from a calling party to an unavailable called party's wireless unit, said method comprising the computer implemented steps of:

receiving a call intended for unavailable called party's wireless unit at a wireless service node, said call having been forwarded from a mobile switching center;

sending a short message from said wireless service node to a short message service center for delivery to said unavailable called party's wireless unit, said short message identifying said calling party and said short message providing an option to join said call during said call; and in response to receipt at said wireless service node of a response to said short message, said response indicating the calling party has selected said option to join said call, instructing said mobile switching center to complete said call to said unavailable called party's wireless unit during said call.

15. The method as claimed in claim 14, including the computer implemented step of determining if said calling party desires to send a page to said unavailable called party's wireless unit.

16. The method as claimed in claim 14, including the computer implemented step of identifying said calling party.

17. The method as claimed in claim 16, wherein said step of identifying said calling party includes the computer implemented step of prompting said calling party to identify himself.

18. A system for processing a call from a calling party to an unavailable called party's wireless unit, said system comprising:

means for receiving from said calling party a call intended for said called party's wireless unit;

means for sending a short message to said unavailable called party's wireless unit, said short message identifying said calling party and said short message providing the called party an option to join said calling party during said call;

means responsive to receipt of a response to short message, said response indicating selection of said option to join said call for completing said call to said unavailable called party's wireless unit; and means for connecting said calling party to said unavailable called party's wireless unit during said call, if said response to said short message indicates said called party has selected said option to join said calling party.

19. The system as claimed in claim 18, further comprising a means for determining if said unavailable called party's wireless unit is in a page-only mode.

20. The system as claimed in claim 18, further comprising a means for prompting said calling party to identify himself.

* * * * *